United States Patent
Rewaskar et al.

(10) Patent No.: US 11,048,537 B2
(45) Date of Patent: *Jun. 29, 2021

(54) VIRTUAL MACHINE COMPUTE RE-CONFIGURATION

(71) Applicant: Microsoft Technology Licensing, LLC, Redmond, WA (US)

(72) Inventors: Sushant Pramod Rewaskar, Redmond, WA (US); Chandramouleswaran Ravichandran, Woodinville, WA (US); Aswin Parthasarathy Akkur Rajamannar, Bellevue, WA (US); Md. Daud Hossain Howlader, Bothell, WA (US); Bowen Xu, Seattle, WA (US); Douglas William Jordan, Seattle, WA (US); Vipul Arunkumar Somani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 44 days.

This patent is subject to a terminal disclaimer.

(21) Appl. No.: 15/870,981

(22) Filed: Jan. 14, 2018

(65) Prior Publication Data

US 2019/0146822 A1 May 16, 2019

Related U.S. Application Data

(60) Provisional application No. 62/584,735, filed on Nov. 10, 2017.

(51) Int. Cl.
*G06F 9/455* (2018.01)
*G06F 9/4401* (2018.01)
(Continued)

(52) U.S. Cl.
CPC ........ *G06F 9/45558* (2013.01); *G06F 9/4406* (2013.01); *G06F 9/44505* (2013.01);
(Continued)

(58) Field of Classification Search
CPC ............... G06F 9/45558; G06F 9/4406; G06F 9/44505; G06F 9/45533; G06F 9/4558;
(Continued)

(56) References Cited

U.S. PATENT DOCUMENTS 7,500,244 B2    3/2009   Galal et al.
7,933,869 B2    4/2011   Becker et al.
(Continued)

OTHER PUBLICATIONS

Rewaskar, Sushant Pramod et al.; "Virtual Machine Server-Side Compute Reconfiguration"; U.S. Appl. No. 15/916,221, filed Mar. 8, 2018; 31 pages.
(Continued)

*Primary Examiner* — Jacob D Dascomb
(74) *Attorney, Agent, or Firm* — Davin Chin; Chin IP, PLLC

(57) ABSTRACT

The disclosed technology is generally directed to virtual machines. In one example of the technology, data associated with a virtual machine configuration request is received. A first virtual machine to be reconfigured is provided. The first virtual machine is booted. The first virtual machine is a system virtual machine, the first virtual machine is re-provisioned into be reconfigured in accordance with the virtual machine configuration request without rebooting the first virtual machine.

20 Claims, 5 Drawing Sheets

(51) Int. Cl.
  *G06F 9/445* (2018.01)
  *H04L 29/12* (2006.01)
  *H04L 12/24* (2006.01)

(52) U.S. Cl.
  CPC ...... *G06F 9/45533* (2013.01); *H04L 41/0813* (2013.01); *H04L 41/0816* (2013.01); *H04L 61/2007* (2013.01); *H04L 61/2015* (2013.01); *G06F 2009/4557* (2013.01); *G06F 2009/45562* (2013.01); *G06F 2009/45575* (2013.01); *G06F 2009/45579* (2013.01); *G06F 2009/45595* (2013.01); *H04L 61/6022* (2013.01)

(58) Field of Classification Search
  CPC ......... G06F 9/4856; G06F 2009/45562; G06F 2009/45575; H04L 41/0813; H04L 41/0816; H05L 61/2007; H05L 61/2015
  See application file for complete search history.

(56) References Cited

U.S. PATENT DOCUMENTS

| | | | |
|---|---|---|---|
| 8,336,049 B2 | 12/2012 | Medovich | |
| 8,423,999 B2 | 4/2013 | Matsumoto et al. | |
| 8,447,887 B1 | 5/2013 | Loc et al. | |
| 8,458,700 B1 | 6/2013 | Arrance et al. | |
| 8,826,277 B2 | 9/2014 | Chang et al. | |
| 8,909,780 B1 | 12/2014 | Dickinson et al. | |
| 9,116,727 B2 | 8/2015 | Benny et al. | |
| 9,223,596 B1 | 12/2015 | Araujo | |
| 9,348,628 B2 | 5/2016 | Matsumoto et al. | |
| 9,384,032 B2 | 7/2016 | Lirbank et al. | |
| 9,641,385 B1 | 5/2017 | Daniel et al. | |
| 10,084,652 B2 | 9/2018 | Vatnikov et al. | |
| 10,250,603 B1 | 4/2019 | Roth et al. | |
| 10,263,832 B1 | 4/2019 | Ghosh | |
| 10,263,863 B2 | 4/2019 | Mukerji et al. | |
| 10,282,225 B2 | 5/2019 | Vincent | |
| 10,313,479 B2 | 6/2019 | Lochhead et al. | |
| 10,326,672 B2 | 6/2019 | Scheib et al. | |
| 10,331,588 B2 | 6/2019 | Frandzel et al. | |
| 10,348,767 B1 | 7/2019 | Lee et al. | |
| 10,375,155 B1 | 8/2019 | Cai et al. | |
| 10,379,911 B2 | 8/2019 | Kapitanski et al. | |
| 10,382,392 B2 | 8/2019 | Modi et al. | |
| 10,389,629 B2 | 8/2019 | Dunbar et al. | |
| 10,402,266 B1 | 9/2019 | Kirkpatrick et al. | |
| 10,423,437 B2 | 9/2019 | Kaplan et al. | |
| 2006/0090023 A1 | 4/2006 | Olsen et al. | |
| 2007/0101323 A1 | 5/2007 | Foley et al. | |
| 2008/0109539 A1 | 5/2008 | Foster et al. | |
| 2008/0162491 A1 | 7/2008 | Becker et al. | |
| 2009/0157984 A1 | 6/2009 | Hara et al. | |
| 2011/0154320 A1 | 6/2011 | Verma | |
| 2012/0151477 A1 | 6/2012 | Sinha et al. | |
| 2012/0297179 A1 | 11/2012 | Lirbank et al. | |
| 2013/0031544 A1 | 1/2013 | Sridharan et al. | |
| 2013/0185715 A1 | 7/2013 | Dunning et al. | |
| 2013/0326505 A1* | 12/2013 | Shah | G06F 9/455 718/1 |
| 2014/0012940 A1* | 1/2014 | Joshi | G06F 9/45558 709/214 |
| 2014/0201733 A1 | 7/2014 | Benny et al. | |
| 2014/0229731 A1 | 8/2014 | O'hare et al. | |
| 2015/0058837 A1 | 2/2015 | Govindankutty et al. | |
| 2015/0127830 A1 | 5/2015 | Brown et al. | |
| 2015/0163196 A1 | 6/2015 | Bhagwat et al. | |
| 2015/0178107 A1 | 6/2015 | Gummaraju et al. | |
| 2015/0178109 A1* | 6/2015 | Li | G06F 9/45558 718/1 |
| 2015/0254090 A1* | 9/2015 | Mandava | G06F 9/45558 718/1 |
| 2015/0309805 A1 | 10/2015 | Deshpande et al. | |
| 2016/0105393 A1 | 4/2016 | Thakkar et al. | |
| 2016/0216992 A1* | 7/2016 | Vavrick | G06F 9/45558 |
| 2016/0241438 A1 | 8/2016 | Sundaram et al. | |
| 2016/0246640 A1 | 8/2016 | Vincent | |
| 2017/0060569 A1 | 3/2017 | Piccinini et al. | |
| 2017/0139730 A1 | 5/2017 | Cropper et al. | |
| 2017/0147378 A1* | 5/2017 | Tsirkin | G06F 9/45558 |
| 2017/0185441 A1* | 6/2017 | Hay | G06F 21/566 |
| 2018/0129524 A1 | 5/2018 | Bryant et al. | |
| 2018/0357089 A1 | 12/2018 | Tsirkin | |
| 2019/0123972 A1 | 4/2019 | Parandehgheibi et al. | |
| 2019/0146818 A1 | 5/2019 | Rewaskar et al. | |
| 2019/0146823 A1 | 5/2019 | Rewaskar et al. | |
| 2019/0146824 A1 | 5/2019 | Rewaskar et al. | |
| 2019/0149411 A1 | 5/2019 | Rewaskar et al. | |
| 2019/0280964 A1 | 9/2019 | Michael et al. | |

OTHER PUBLICATIONS

Rewaskar, Sushant Pramod et al.; "Virtual Machine Server-Side Network Adaptation"; U.S. Appl. No. 15/916,225, filed Mar. 8, 2018; 34 pages.

Rewaskar, Sushant Pramod et al.; "Deployment of Partially Provisioned Virtual Machines"; U.S. Appl. No. 15/870,982, filed Jan. 14, 2018; 31 pages.

Rewaskar, Sushant Pramod et al.; "Virtual Machine Client-Side Virtual Network Change"; U.S. Appl. No. 15/870,983, filed Jan. 14, 2018; 35 pages.

"International Search Report and Written Opinion Issued in PCT Application No. PCT/US2018/059118", dated Feb. 20, 2019, 13 Pages.

"International Search Report and Written Opinion Issued in PCT Application No. PCT/US2018/059120", dated Feb. 28, 2019, 14 Pages.

"International Search Report and Written Opinion Issued in PCT Application No. PCT/US2018/059121", dated Feb. 27, 2019, 13 Pages.

"International Search Report and Written Opinion Issued in PCT Application No. PCT/US2018/059122", dated Mar. 4, 2019, 15 Pages.

"International Search Report and Written Opinion Issued in PCT Application No. PCT/US2018/059123", dated Mar. 7, 2019, 13 Pages.

Korbar, Bruno et al.; "Prediction of Virtual Machine Demand"; U.S. Appl. No. 15/914,421, filed Mar. 7, 2018; 39 pages.

Krsul, et al., "VMPlants: Providing and Managing Virtual Machine Execution Environments for Grid Computing", In Proceedings of the ACM/IEEE Conference on Supercomputing, Nov. 6, 2004, 12 Pages.

"International Search Report and Written Opinion Issued in PCT Application No. PCT/US2019/020158", dated Jun. 5, 2019, 11 Pages.

Raghunath, et al., "Prediction Based Dynamic Resource Provisioning in Virtualized Environments", In Proceedings of the IEEE International Conference on Consumer Electronics, Jan. 8, 2017, 6 Pages.

"Non Final Office Action Issued in U.S. Appl. No. 15/914,421", dated Oct. 18, 2019, 9 Pages.

"Non Final Office Action Issued in U.S. Appl. No. 15/916,225", dated Oct. 18, 2019, 10 Pages.

Marques, et al., "Escada: Predicting Virtual Machine Network Bandwidth Demands for Elastic Provisioning in IaaS clouds", In Proceedings of the International Conference on Cloud and Autonomic Computing, Sep. 18, 2017, pp. 10-21.

"Non Final Office Action Issued in U.S. Appl. No. 15/870,983", dated Nov. 19, 2019, 23 Pages.

"Non Final Office Action Issued in U.S. Appl. No. 15/870,982", dated Feb. 4, 2020, 9 Pages.

"Non Final Office Action Issued in U.S. Appl. No. 15/916,221", dated Jan. 23, 2020, 14 Pages.

"Non Final Office Action Issued in U.S. Appl. No. 15/870,983", dated May 14, 2020, 21 Pages.

"Final Office Action Issued in U.S. Appl. No. 15/870,983", dated Sep. 11, 2020, 22 Pages.

(56) References Cited

OTHER PUBLICATIONS

"Final Office Action Issued in U.S. Appl. No. 15/916,221", dated Jul. 10, 2020, 14 Pages.
"Office Action Issued in European Patent Application No. 18804878.9", dated Apr. 1, 2021, 5 Pages.
"Office Action Issued in European Patent Application No. 18807497.5", dated Apr. 9, 2021, 6 Pages.
"Office Action Issued in European Patent Application No. 18807186.4", dated Apr. 9, 2021, 6 Pages.
"Non Final Office Action issued U.S. Appl. No. 15/916,221", dated Apr. 26, 2021, 20 Pages.
"Office Action issued in European Patent Application No. 18804879.7", dated Apr. 9, 2021, 9 Pages.
"Office Action Issued in European Patent Application No. 18807185.6", dated Apr. 29, 2021, 5 Pages.

\* cited by examiner

VIRTUAL MACHINE COMPUTE RE-CONFIGURATION

CROSS-REFERENCE TO RELATED APPLICATION(S)

This application claims priority to U.S. Provisional Pat. App. No. 62/584,735, filed Nov. 10, 2017, entitled "VIRTUAL MACHINE PREPROVISIONING". The entirety of this afore-mentioned application is incorporated herein by reference.

BACKGROUND

In some examples, a virtual machine (VM) is an emulation of a computer system that provides the functionality of a physical computer system. A host machine may create and run multiple VM instances. In some examples, VMs may be "rented" and accessed from the cloud by users. When a user wants a VM to be provisioned, in some examples, the user may have many options to choose from and particular configurations to be made for the VM, such as operating system (OS), VM size, machine name, username, password, time zone, and/or the like.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to virtual machines. In one example of the technology, data associated with a virtual machine configuration request is received. In some examples, a first virtual machine to be reconfigured is provided. In some examples, the first virtual machine is booted. In some examples, the first virtual machine is a system virtual machine. In some examples, the first virtual machine is re-provisioned to be reconfigured in accordance with the virtual machine configuration request without rebooting the first virtual machine.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
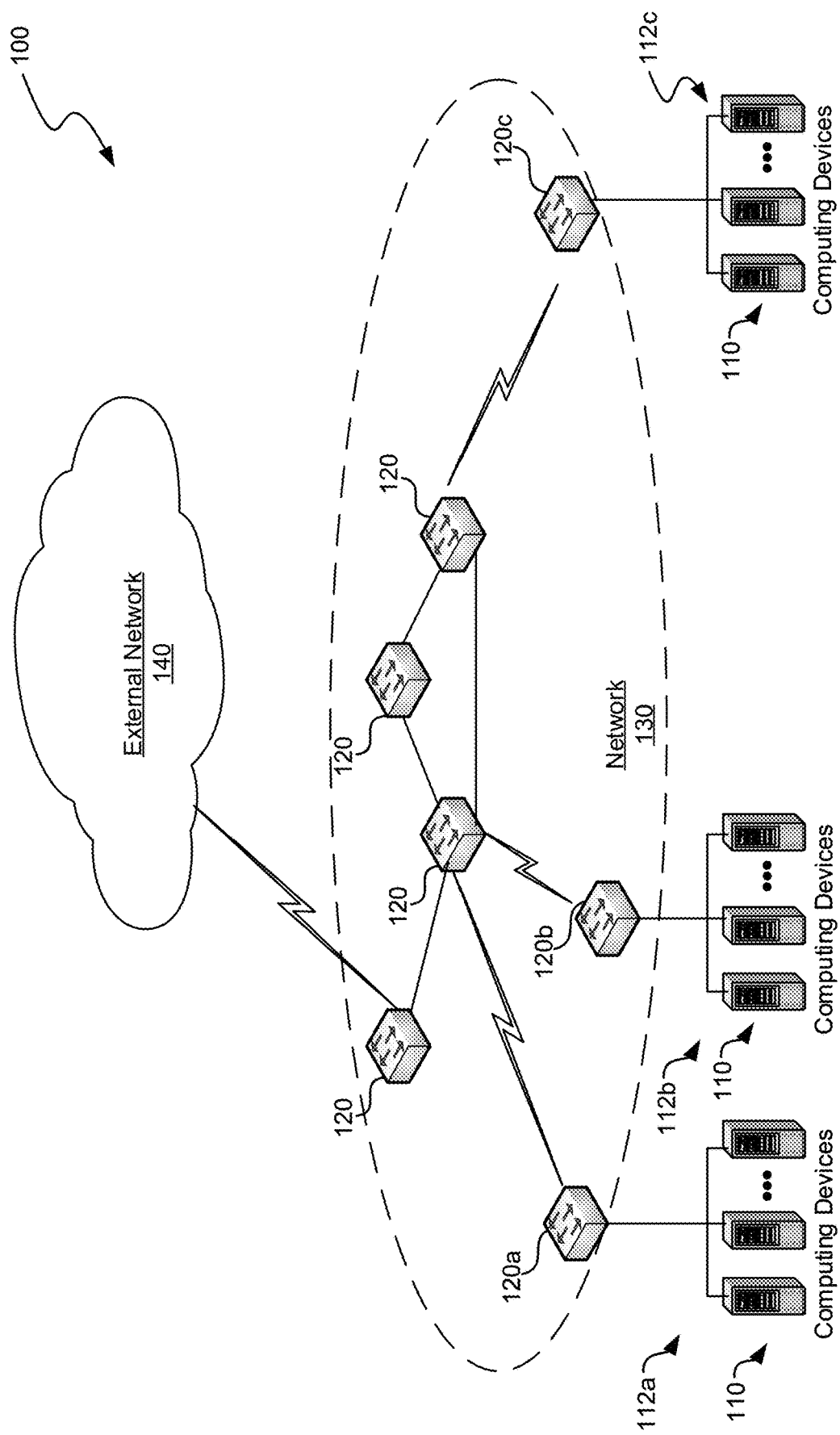
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Accordingly, for example, a system or component may be a process, a process executing on a computing device, the computing device, or a portion thereof.

Introduction

Briefly stated, the disclosed technology is generally directed to virtual machines. In one example of the technology, data associated with a virtual machine configuration request is received. In some examples, a first virtual machine to be reconfigured is provided. In some examples, the first virtual machine is booted. In some examples, the first virtual machine is a system virtual machine. In some examples, the first virtual machine is re-provisioned to be reconfigured in accordance with the virtual machine configuration request without rebooting the first virtual machine.

A VM, including the compute artifacts of a VM, is reconfigured without rebooting the VM in some examples. Such compute artifacts may include, for example, the machine name, account username, account password, time zone, and/or the like. The VM may be a system VM, that is, a VM that provides the functionality to operate an entire operating system. In some examples, a user may wish an existing VM already used to be the VM to be reconfigured. In other examples, a partially configured VM may be reconfigured. For example, partially configured VMs, which are configured in all aspects except for customer specific settings in some examples, may be pooled so that fully configured VMs may be provided more quickly upon request by reconfiguring a partially configured VM than creating a new VM from scratch.

A VM may be reconfigured based on a virtual machine reconfiguration request that includes user-specific settings. Artifacts, including compute artifacts and possibly other artifacts, may be allocated to the user, modified, and/or created as needed. Information based on the virtual machine reconfiguration request may then be made available to an agent on that virtual machine to be reconfigured. The agent may then cause the VM to be reconfigured by accepting the user-specific settings associated with the reconfiguration requests, and applying those user-specific settings, so that compute aspects of the VM can be reconfigured accordingly.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown).

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communication between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

Illustrative Computing Device

Figure 2:
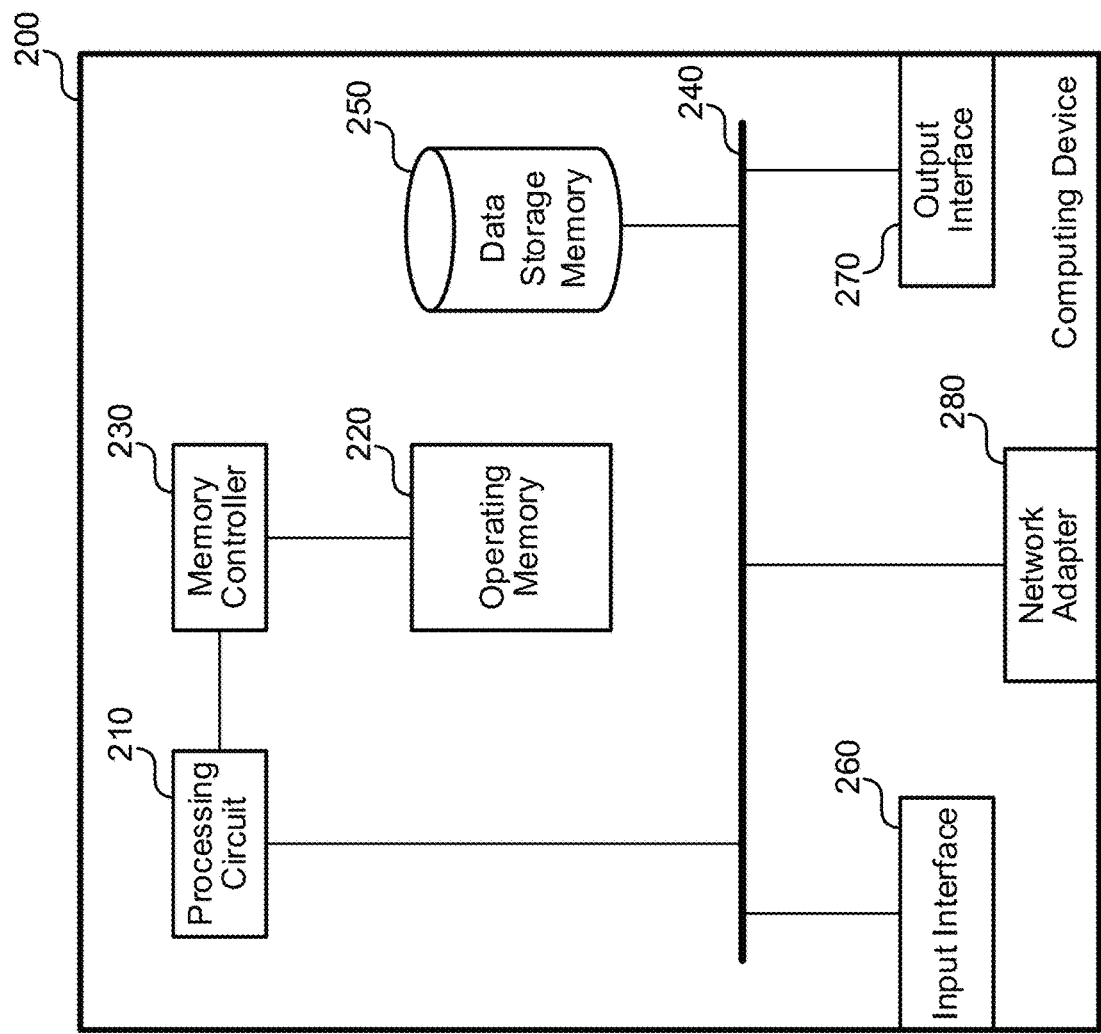
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Likewise, computer device 200 may be an example any of the devices illustrated in FIG. 5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage medium," throughout the specification and the claims whether used in the singular or the plural, is defined herein so that the term "processor-readable storage medium" specifically excludes and does not encompass communications media, any communications medium, or any signals per se. However, the term "processor-readable storage medium" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one storage memory (e.g. data storage memory 250), at least one operating memory (e.g., operating memory 220) and at least one processor (e.g., processing unit 210) that are respectively adapted to store and execute processor-executable code that, in response to execution, enables computing device 200 to perform actions, such as, in some examples, the actions of process 490 of FIG. 4, as discussed in greater detail below.

Figure 3:
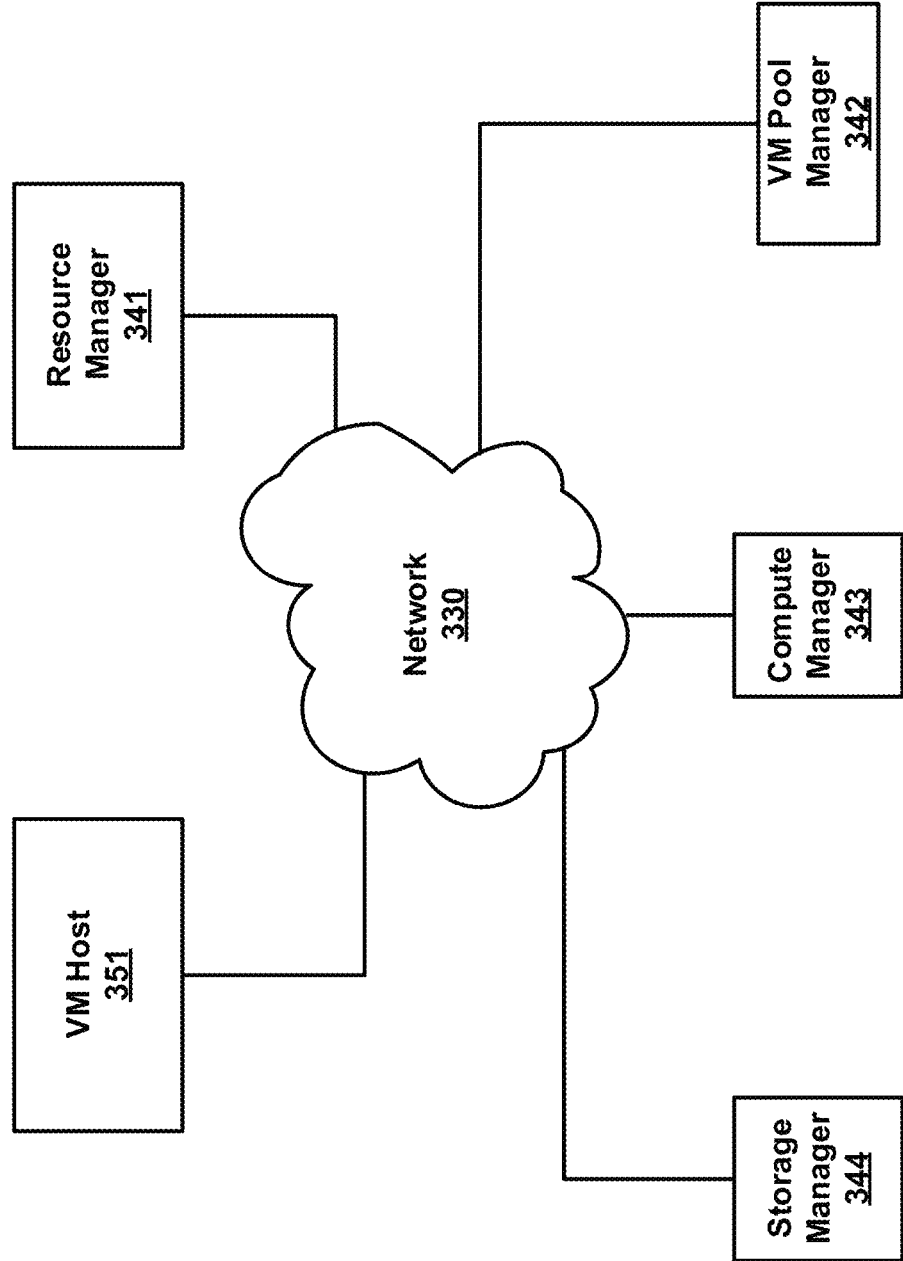
FIG. 3 is a block diagram illustrating an example of a system.

FIG. 3 is a block diagram illustrating an example of a system (300). System 300 may include network 330, as well as resource manager 341, VM pool manager 342, compute manager 343, storage manager 344, and virtual machine host 351, which all may connect to network 330.

Resource manger 341 may be configured to communicate with customers, including receiving customer requests, and to coordinate actions based on customer requests. Resource manager 341 may also be configured to coordinate other high-level functions associated with VM management. In some examples, compute manager 343 manages the compute aspects of VMs, and storage manager 344 manages the storage aspect of VMs. In some examples, compute manager 343 also orchestrates management of other resources, not just compute resources. In some examples, virtual machine host 351 is configured to create and run VMs, responsive to control from, inter alia, compute manager 343.

In some examples, VM pool manager 342 is configured to manage a pool of partially provisioned VMs. The partially provisioned VMs may be booted and configured except with respect to customer-specific settings. In some examples, some properties cannot be configured without reboot of a VM or recreating the VM, such as VM size, OS type, storage type, and/or the like. VM pool manager 342 may manage keeping a suitable number of each combination of partially configured VMs that may be needed.

Network 3300 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. In essence, network 330 includes any communication technology by which information may travel between resource manager 341, VM pool manager 342, compute manager 343, storage manager 344, and virtual machine host 351. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

Figure 4:
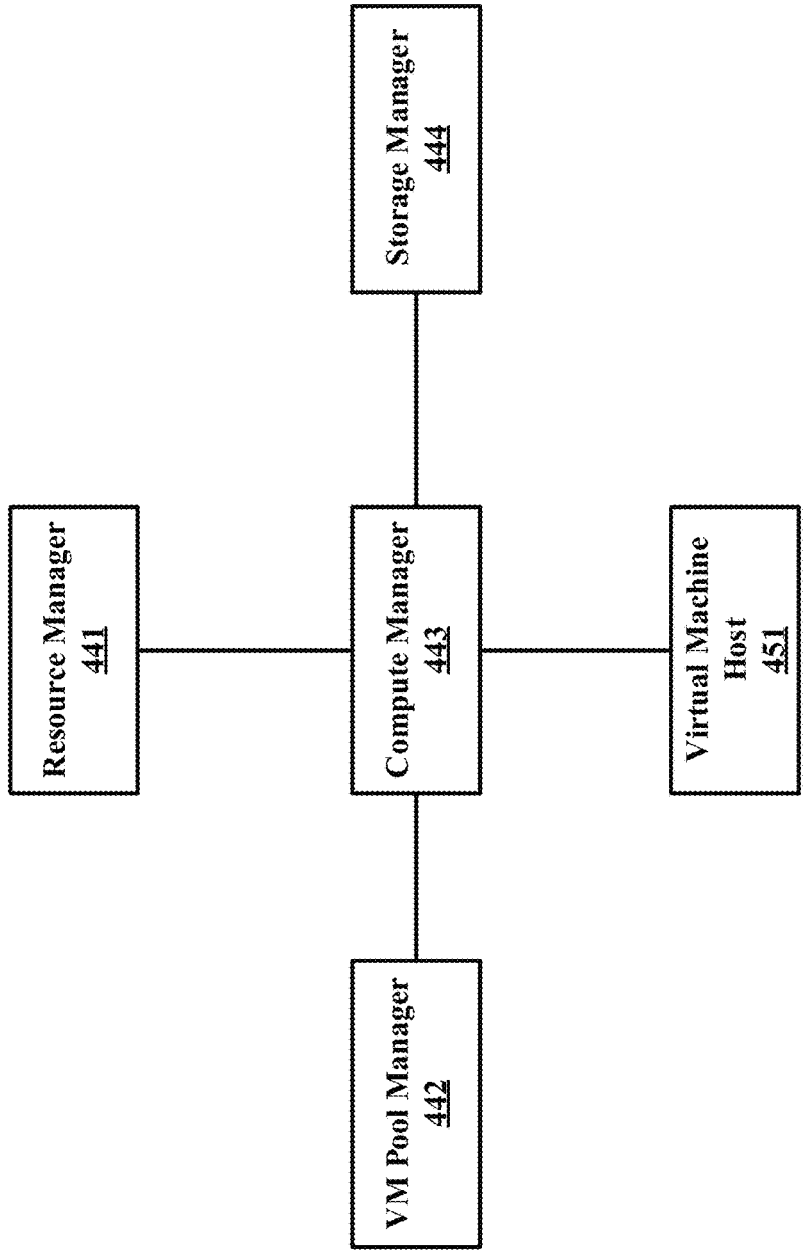
FIG. 4 shows a block diagram illustrating an example of the system of FIG. 3.

FIG. 4 is a block diagram illustrating an example of a system (400), which may be employed as an example of system 300 of FIG. 3. System 400 may include resource manager 441, VM pool manager 442, compute manager 443, storage manager 444, and virtual machine host 451. Although only one virtual machine host is shown in FIG. 4, some examples may include a larger number of virtual machine hosts.

In various some virtualization environments, a VM (such as a Windows, Linux, or Unix VM) is created from scratch following a customer/request for that VM. For example, such creation may include retrieving an image from Platform Image Repository (PIR), copying the image to the customer's account, creating a VM with that image, and booting the VM up. Using a Windows VM as an example, once started, the VM goes through Windows setup (specialize and out-of-box experience (OOBE) passes) which provisions the VM from the generalized image to a specialize image. Despite speed increases in modern computing systems, various amounts of time are associated with creating a VM. For example, some example VMs are associated with end-to-end "spin-up" times in the vicinity of one to five minutes, for example, depending on various factors such as operating system, network speed, resources of the physical hardware, virtualization system load, etc. The present disclosure may be employed, for example, by various providers and tenants of virtualization services to reduce "spin-up time" for VMs following customer requests for VMs. For example, various aspects of the present technology may be employed to facilitate at least partial configuration, provisioning, booting, or other steps typically performed prior to a VM being ready for customer use before a customer has requested the VM. By, for example, performing such steps prior to the request, the duration of time between the customer request and availably of the VM may be reduced in comparison to the typical amount of time associated with "spinning-up" a VM "from scratch" following a request.

Some examples of system 400 may operate in a hierarchy of multiple levels, with, for example, individual virtual machines hosts on the node level, in which there are clusters of virtual machines hosts, and regional data centers each consisting of multiple clusters. In other examples, other suitable arrangements may be employed. In some examples, compute manager 443 and storage manager 444 each encompass devices operating at more than one level of the hierarchy.

In some examples, VM pool manager 442 is configured to manage a pool of partially provisioned VMs. The partially provisioned VMs may be booted and configured except with respect to customer-specific settings. In some examples, some properties cannot be configured without reboot of a VM or recreating the VM, such as VM size, OS type, storage type (e.g., premium storage or standard storage), type of internet routing (e.g., IPv4 or IPv6), and/or the like. VM pool manager 442 may manage keeping a suitable number of each combination of partially configured VMs that may be needed.

Partially provisioned VMs that are configured except with regard to certain user-specific settings, including certain user-specific compute settings, may each be generated as follows. Without customer data, generic artifacts are created, including generic compute artifacts. A VM is created using the generic artifacts, using the particular combination of properties that are not reconfigured (e.g., VM size, OS type, storage type, processor resources, memory resources, etc.). During the boot process, the VM enters a state where the VM actively seeks new configuration, so that the VM can be reconfigured with customer-specific compute settings once the customer-specific compute settings are published. Also, the VM is created such that the VM includes an agent that is capable of reconfiguring the VM according to the user-specific settings in response to publication of the customer-specific compute settings. The manner in which the VM is partially configured and then enters into a state varies depending on the OS type of the VM.

In some examples in which the VM has a Linux OS, the VM is booted, the VM is passed a tag that indicates that configuration is partial and not the final configuration. When the VM is booted, the VM is configured with some but not all of the configurations—some configurations, including certain user-specific compute settings, are not done. However, in some examples, even though some user-specific compute settings are not done, or are done but given generic placeholder/default settings rather than user-specific settings, the VM sends a success message indicating that the configuration is done. In some examples, the success message is received by virtual machine host 451, and is sent from virtual machine host 451 to compute manager 443.

In response to the tag indicating that the configuration is only partial and not the final configuration, in some examples, the VM enters a state in which the VM polls VM host 451 for the new configuration. In some examples, a configuration with the tag is treated as a partial and not final configuration, and a configuration lacking the tag is treated as a final configuration. In some examples, the VM remains in this "partially booted" state, waiting for the complete configuration, until VM host 451 publishes a full configuration for the VM, at which point the VM's polling indicates that the full configuration is available.

In some examples in which the VM has a Windows OS, the VM is booted with a minimal configuration. In some examples, windows itself cannot provision again after the minimal configuration performed in the first boot. Instead, in some examples, after setup finishes, a code extension is installed and executed in the VM which causes the VM to keep running, and to enter a state in which the VM polls VM host 451 for the new configuration. In some examples, the VM remains polling state, waiting for the complete configuration, until VM host 451 publishes a full configuration for the VM, at which point the VM's polling indicates that the full configuration is available. In some examples, the code extension is capable of performing the reconfiguration to the full configuration.

Regardless of the OS type, after partially provisioning, in some examples, the VM is in the pool of VMs managed by VM pool manager 442, and is in a state in which it is polling for a full configuration to be used by which to reconfigure the VM.

Resource manager 441 may receive requests for VMs to customers, and may manage such requests. In some examples, customers may communicate with system 400 via a portal, and the portal may communicate requests from customer to resource manager 441. In response to customer request(s) for VM, resource manager 441 may send a request to compute manager 443 to deploys VMs. In response to the request from resource manager 441, compute manager 443 may communicate with VM pool manager 442 to determine from VM pool manager 442 whether or not there are existing partially provisioned VMs pooled by VM pool manger 442 that meet the required criteria. If, not VM will be created from scratch to meet the request.

If, however, there are available partially provisioned VMs in the VM pool managed by VM pool manager 442, then, in some examples, each partially provisioned VM is reconfigured to meet user-specific settings required based on the VMs requested, as follows for each VM in some examples. Computer manager 443 may send a request to storage manager 444 to cause corresponding storage artifacts to move their association from the platform to the particular customer. Such storage artifacts may include, for example, the disk on which the OS will be copied to and in which the OS will run, and any additional storage requested by the customer. By moving the association of the storage artifacts to the customer, in some examples, the customer has access to and can manage the storage artifacts.

Compute manager 443 may also request that certain storage artifacts be modified and/or reconfigured and/or created based on the user-specific settings. For example, the customer may have requested additional storage, which may be created and then associated with the particular customer. Compute manager 443 may also move corresponding compute artifacts, associated with the user-specific compute settings, to the particular customer. In this way, in some examples, the customer has access to and can manage the compute artifacts. Compute manager 443 may also cause certain compute artifacts to be modified and/or reconfigured based on the user-specific settings.

An example of modifying and/or reconfiguring a compute artifact based on user-specific settings is changing the machine name based on the user-specific compute settings. A default/placeholder machine name may have been given to the partially provisioned VM during partial configuration in order to complete the initial, partial configuration. However, as part of the fully configuration the VM based on the user-specific settings, the user may have requested a VM with a particular machine name. Compute manager 443 may modify the machine name based on the user-specific settings.

Compute manager 443 may then communicate the new configuration, to VM host 451. VM host 451 may then publish the new configuration, so that the new configuration is available to be polled by the VM, which is in a state of polling for the new configuration, and the polling will be successful once the new configuration is published.

The agent on the VM may then accept the user-specific settings associated with the reconfiguration requests, and then apply those user-specific settings, so that compute aspects of the VM are reconfigured accordingly. In this way, in some examples, the partially provisioned VM becomes reconfigured based on the user-specific settings.

The manner in which the reconfiguration happens may depend in the OS type in some examples.

For instance, in some examples, if the OS type is Linux, the reconfiguration may be completed at this time. In some examples, the VM was left in a "partially booted" state, waiting for the complete configuration, and the configuration is allowed to finish now that the full configuration has been received, using the newly received full configuration.

In some examples, if the OS type is Windows, Windows cannot perform the configuration again. Instead, in some examples, the same code extension that caused the VM to enter a state in which it polls VM host 451 for the new configuration may cause the VM to be reconfigured based on the full configuration, by in essence using the same configuration process normally used by Windows, except that the configuration is performed by the code extension rather than by Windows.

After the reconfiguration is successfully completed, the VM may send a success message to VM host 451 that the reconfiguration is successful. VM host 451 may then communicate the success message to compute manager 443. Compute manager 443 may then communicate the success message to resource manager 441, which may in turn communicate the success message to the customer portal, which may in turn communicate the success to the customer. In some examples, use of the re-configured VM may then be tracked, and success or failure of the use of the re-configured VM may be reported, and appropriate actions may be taken based on the success or failure of the use of the re-configured VM.

An example of reconfiguring a partially provisioned VM has been described. A fully provisioned VM may also be reconfigured based on a customer request, and this reconfiguration may be performed without rebooting the VM. In some examples, the process is essentially the same as reconfiguring a partially provisioned VM, except that artifacts already associated with the customer do not need to have their association moved to the customer.

Resource manager 441 may receive a request from a customer to reconfigure a fully provisioned VM. In response to the customer request to reconfigure the VM, resource manager 441 may send a request to compute manager 443 to reconfigure the VM.

In response to the customer request from resource manager 441 to reconfigure the VM, compute manager 443 may, if relevant, send a request to storage manager 444 to cause corresponding storage artifacts to be modified and/or reconfigured and/or created based on the user-specific settings for which the VM is to be reconfigured.

In some examples, compute manager 443 also causes certain corresponding compute artifacts to be modified and/or reconfigured based on the user-specific settings. An example of modifying and/or reconfiguring a compute artifact based on user-specific settings is changing the machine name based on the user-specific compute settings. In some examples, the fully provisioned VM already has a machine name. However, part of the reconfiguration request by the customer may include a request that the machine name of the VM be changed, and the new machine name requested by the customer may be part of the user-specified settings in the VM reconfiguration request. Compute manager 443 may modify the machine name based on the user-specific settings.

Compute manager 443 may then communicate the new configuration to VM host 451. VM host 451 may then provide the new configuration to the VM. The agent on the VM may then accept the user-specific settings associated with the reconfiguration request, and apply those user-specific settings, so that compute aspects of the VM can be reconfigured accordingly. In this way, in some examples, the VM becomes reconfigured based on the user-specific settings. After the reconfiguration is successfully completed, the VM may send a success message to VM host 451 that the reconfiguration is successful. VM host 451 may then communicate the success message to compute manager 443. Compute manager 443 may then communicate the success message to resource manager 441, which may in turn communicate the success message to the customer portal, which in turn may communicate the success to the customer.

Illustrative Process

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a processor-implemented process. As an alternate example, these processes may be encoded as processor-executable instructions and transmitted via a communications medium.

Figure 5:
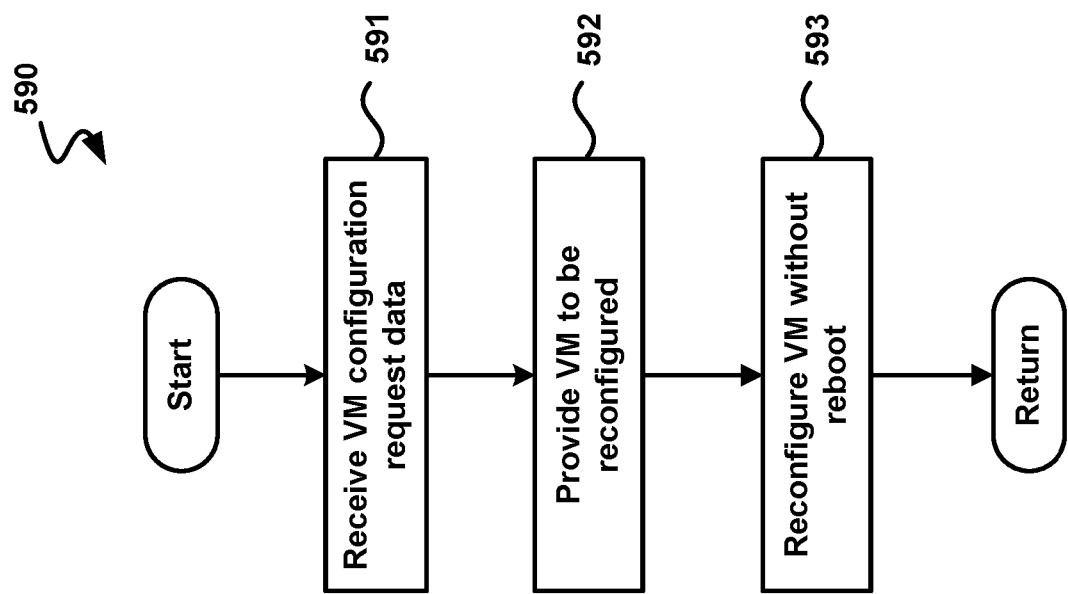
FIG. 5 shows a logical flow diagram illustrating an example of a process that may be employed by an example of the virtual machine host of FIG. 3, in accordance with aspects of the present disclosure.

FIG. 5 is a flow diagram illustrating an example process (590) that may be performed, e.g., by a virtual machine host 451 of FIG. 4.

In the illustrated example, step 591 occurs first. At step 591, in some examples, data associated with a virtual machine configuration request is received. As shown, step 592 occurs next in some examples. At step 592, in some examples, a first virtual machine to be reconfigured is provided. In some examples, the first virtual machine is booted. In some examples, the first virtual machine is a system virtual machine.

As shown, step 593 occurs next in some examples. At step 593, in some examples, the first virtual machine is re-provisioned into be reconfigured in accordance with the virtual machine configuration request without rebooting the first virtual machine. The process may then proceed to a return block, where other processing is resumed.

Conclusion

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a device including at least one memory adapted to store run-time data for the device, and at least one processor that is adapted to execute processor-executable code that, in response to execution, enables the device to perform actions, including:
receiving data associated with a virtual machine configuration request;
providing a first virtual machine to be reconfigured, wherein the first virtual machine is booted prior to the virtual machine configuration request, and wherein the first virtual machine is a system virtual machine; and
re-provisioning the first virtual machine to be reconfigured in accordance with the virtual machine configuration request without rebooting the first virtual machine by causing the first virtual machine to enter a polling state, wherein re-provisioning the first virtual machine includes modifying at least one compute artifact to the first virtual machine for which an operating system of the first virtual machine prompts reboot of the first virtual machine to modify the at least one compute artifact.

2. The apparatus of claim 1, wherein the virtual machine configuration request includes a plurality of user-specific settings, and wherein re-provisioning the first virtual machine includes, via an agent in the first virtual machine: accepting the plurality of user-specific setting, and applying the plurality of user-specific settings to the first virtual machine.

3. The apparatus of claim 1, wherein the virtual machine configuration request includes a plurality of user-specific settings, the user-specific settings include a plurality of compute artifacts, and wherein plurality of compute artifacts includes a machine name.

4. The apparatus of claim 1, wherein the virtual machine configuration request includes a plurality of user-specific settings, and wherein re-provisioning the first virtual machine to be reconfigured in accordance with the virtual machine configuration request includes reconfiguring the first virtual machine according to the user-specific virtual machine configuration settings.

5. The apparatus of claim 1, the actions further including reporting a success message in response to successfully re-provisioning the first virtual machine.

6. The apparatus of claim 1, the action further including, after re-provisioning the first virtual machine, tracking usage of the first virtual machine, and reporting success of usage of the first virtual machine.

7. The apparatus of claim 1, wherein the first virtual machine is a partially configured virtual machine that is polling for a full configuration.

8. A method, comprising:
receiving a plurality of user-specific settings that are associated with a virtual machine configuration request;

providing a first virtual machine, wherein the first virtual machine is booted prior to the virtual machine configuration request; and reconfiguring the first virtual machine in accordance with user-specific settings without rebooting the first virtual machine by causing the first virtual machine to enter a polling state, wherein reconfiguring the first virtual machine includes modifying at least one compute artifact to the first virtual machine for which an operating system of the first virtual machine prompts reboot of the first virtual machine to modify the at least one compute artifact.

9. The method of claim 8, wherein reconfiguring the first virtual machine includes, via an agent in the first virtual machine: accepting the plurality of user-specific setting, and applying the plurality of user-specific settings to the first virtual machine.

10. The method of claim 8, wherein the plurality of user-specific settings include a plurality of compute artifacts, and wherein plurality of compute artifacts includes a machine name.

11. The method of claim 8, further comprising reporting a success message in response to successfully reconfiguring the first virtual machine.

12. The method of claim 8, further comprising, after reconfiguring the first virtual machine, tracking usage of the first virtual machine, and reporting success of usage of the first virtual machine.

13. The method of claim 8, wherein the first virtual machine is a partially configured virtual machine that is polling for a full configuration.

14. A processor-readable storage medium, having stored thereon processor-executable code that, upon execution by at least one processor, enables actions, comprising:

receiving information associated with a virtual machine configuration request; and reconfiguring a first virtual machine in accordance with the virtual machine configuration request without rebooting the first virtual machine by causing the first virtual machine to enter a polling state, wherein the first virtual machine is booted prior to the virtual machine configuration request, wherein reconfiguring the first virtual machine includes modifying at least one compute artifact to the first virtual machine for which an operating system of the first virtual machine prompts reboot of the first virtual machine to modify the at least one compute artifact.

15. The processor-readable storage medium of claim 14, wherein the virtual machine configuration request includes a plurality of user-specific settings, and wherein reconfiguring the first virtual machine includes, via an agent in the first virtual machine: accepting the plurality of user-specific setting, and applying the plurality of user-specific settings to the first virtual machine.

16. The processor-readable storage medium of claim 14, wherein the virtual machine configuration request includes a plurality of user-specific settings, and wherein reconfiguring the first virtual machine includes, via an agent in the first virtual machine: accepting the plurality of user-specific setting, and applying the plurality of user-specific settings to the first virtual machine.

17. The processor-readable storage medium of claim 14, wherein the virtual machine configuration request includes a plurality of user-specific settings, the user-specific settings include a plurality of compute artifacts, and wherein plurality of compute artifacts includes a machine name.

18. The processor-readable storage medium of claim 14, further comprising reporting a success message in response to successfully re-provisioning the first virtual machine.

19. The processor-readable storage medium of claim 14, further comprising, after re-configuring the first virtual machine, tracking usage of the first virtual machine, and reporting success of usage of the first virtual machine.

20. The processor-readable storage medium of claim 14, wherein the first virtual machine is a partially configured virtual machine that is polling for a full configuration.

* * * * *